United States Patent
Long

(10) Patent No.: US 12,373,558 B1
(45) Date of Patent: Jul. 29, 2025

(54) COMPUTER-BASED SYSTEM TO VALIDATE BUILD INTEGRITY OF SOFTWARE PRODUCTS

(71) Applicant: Wells Fargo Bank, N.A., San Francisco, CA (US)

(72) Inventor: Jeremy W. Long, Herndon, VA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 485 days.

(21) Appl. No.: 17/650,346

(22) Filed: Feb. 8, 2022

Related U.S. Application Data

(60) Provisional application No. 63/147,646, filed on Feb. 9, 2021.

(51) Int. Cl.
*G06F 21/56* (2013.01)

(52) U.S. Cl.
CPC ...... *G06F 21/563* (2013.01); *G06F 2221/033* (2013.01)

(58) Field of Classification Search
CPC .......................... G06F 21/563; G06F 2221/033
See application file for complete search history.

(56) References Cited

U.S. PATENT DOCUMENTS

| | | | |
|---|---|---|---|
| 6,536,037 B1 * | 3/2003 | Guheen | G06F 8/71 703/2 |
| 8,407,800 B2 | 3/2013 | Schloegel et al. | |

(Continued)

FOREIGN PATENT DOCUMENTS

| | | |
|---|---|---|
| CN | 103559125 A | 2/2014 |
| CN | 110263539 A | 9/2019 |

(Continued)

OTHER PUBLICATIONS

"Binary Authorization for Borg: how Google verifies code provenance and implements code identity", Google Cloud, accessed on Feb. 8, 2022, Retrieved from: https://cloud.google.com/security/binary-authorization-for-borg/#cio-level-summary, 13 pp.

(Continued)

*Primary Examiner* — Oleg Korsak
*Assistant Examiner* — Devin E Almeida
(74) *Attorney, Agent, or Firm* — Shumaker & Sieffert, P.A.

(57) ABSTRACT

Techniques are described for validating build integrity of software products, such as applications or containers. More specifically, this disclosure describes a build integrity validation system that analyzes build artifacts resulting from a software build process to create source code assertions, and compares the assertions against the source code from which the build artifacts were produced. The build integrity validation system validates that a particular build artifact is producible by the source code to ensure that no additional code was introduced during the build process. The build integrity validation system may also reverse the analysis to validate that the source code is able to produce the build artifacts to ensure that no code was removed or modified during the build process. The build integrity validation system identifies and reports identified discrepancies between the source code and the build artifacts resulting from the software build process of the source code.

20 Claims, 6 Drawing Sheets

(56) References Cited

U.S. PATENT DOCUMENTS

| | | | |
|---|---|---|---|
| 8,429,628 | B2 | 4/2013 | Spurlin |
| 8,949,788 | B2 | 2/2015 | Bonnet |
| 9,063,672 | B2 | 6/2015 | Madl et al. |
| 10,691,810 | B1 | 6/2020 | Freitag et al. |
| 11,055,077 | B2* | 7/2021 | Krishnamoorthy ....... G06F 8/53 |
| 11,055,418 | B2* | 7/2021 | McDuff ................. G06F 8/53 |
| 11,151,024 | B2 | 10/2021 | Hwang et al. |
| 11,494,493 | B1* | 11/2022 | Baird ................. H04L 9/0894 |
| 11,640,282 | B2* | 5/2023 | Giltner ................. G06F 9/3836 717/104 |
| 2006/0110043 | A1* | 5/2006 | Reissman ............... G06F 18/40 382/203 |
| 2010/0246827 | A1 | 9/2010 | Lauter et al. |
| 2014/0282403 | A1* | 9/2014 | Frenkiel ................... G06F 8/73 717/123 |
| 2016/0179502 | A1 | 6/2016 | Cawley |
| 2016/0321089 | A1 | 11/2016 | Sandlin et al. |
| 2017/0169229 | A1 | 6/2017 | Brucker et al. |
| 2019/0361680 | A1 | 11/2019 | Sanchez et al. |
| 2020/0004519 | A1* | 1/2020 | Ryall ...................... G06F 8/71 |
| 2020/0125344 | A1 | 4/2020 | Varghese et al. |
| 2021/0042217 | A1 | 2/2021 | Hwang et al. |
| 2021/0334363 | A1 | 10/2021 | Kim |
| 2022/0058011 | A1* | 2/2022 | Scheinkman ....... G06F 9/45545 |
| 2022/0164171 | A1* | 5/2022 | Johnson .................... G06F 8/77 |
| 2022/0300280 | A1 | 9/2022 | Rafey |
| 2022/0398308 | A1* | 12/2022 | Zerah ..................... G06F 21/52 |

FOREIGN PATENT DOCUMENTS

| | | |
|---|---|---|
| JP | 2013152559 A | 8/2013 |
| JP | 2019220110 A | 12/2019 |
| WO | 2020240830 A1 | 12/2020 |

OTHER PUBLICATIONS

"Chapter 4. The class File Format", Oracle, accessed on Feb. 8, 2022, Retrieved from: https://docs.oracle.com/javase/specs/jvms/se7/html/jvms-4.html.

"Image Layer Details—owasp/dependency-check:6.2.2", Dockerhub, Accessed on Feb. 8, 2022, Retrieved from: https://hub.docker.com/layers/owasp/dependency-check/6.2.2/images/sha256-4c02a0955cc085b10d6360063eeb78486bfc19782c260c146b2723ade1c26bd1?context=explore, 4 pp.

"JAR File Specification", Oracle, accessed on Feb. 8, 2022, Retrieved from: https://docs.oracle.com/javase/7/docs/technotes/guides/jar/jar.html, 14 pp.

"Linux Foundation Announces Free sigstore Signing Service to Confirm Origin and Authenticity of Software", Linux, Mar. 9, 2021, 3 pp.

"Sample application", Docker Doc, Accessed on Feb. 8, 2022, Retrieved from: https://docs.docker.com/get-started/02_our_app/, 4 pp.

"Sunspot: An Implant in the Build Process", CrowdStrike Intelligence Team, Jan. 11, 2021, 8 pp.

Long, "DependencyCheck/Dockerfile", Github, Accessed on Feb. 8, 2022, Retrieved from: https://github.com/jeremylong/DependencyCheck/blob/v6.2.2/Dockerfile, 2 pp.

Ramakrishna, "New Findings From Our Investigation of Sunburst", Jan. 11, 2021, 5 pp.

Thompson, "Reflections on Trusting Trust", Turing Award Lecture, vol. 27, No. 8, Aug. 1984, 3 pp.

Wheeler, ". David A. Wheeler's Page on Fully Countering Trusting Trust through Diverse Double-Compiling (DDC)—Countering Trojan Horse attacks on Compilers", accessed on Jan. 25, 2021, retrieved from https://dwheeler.com/trusting-trust/, 20 pp.

Bhardwaj et al., "Reverse Engineering—A Method for Analyzing Malicious Code Behavior", 2021 International Conference on Advances in Computing, Communication, and Control, Dec. 3, 2021, 5 pp., URL: https://ieeexplore.ieee.org/abstract/document/9697150.

Marklodato, "in-toto/attestation", GitHub, 8 pp., Retrieved from the Internet on Oct. 17, 2022 from URL: https://github.com/in-toto/attestation/tree/v0.1.0#readme.

Shi et al., "Reverse Engineering of Design Patterns from Java Source Code", 21st IEEE/ACM International Conference on Automated Software Engineering, IEEE, Sep. 18, 2006, pp. 123-134, URL: https://ieeexplore.ieee.org/abstract/document/4019568.

Notice of Allowance from U.S. Appl. No. 18/055,684 dated Sep. 11, 2024, 9 pp.

Corrected Notice of Allowance from U.S. Appl. No. 18/055,684 dated Dec. 20, 2024, 5 pp.

Notice of Allowance from U.S. Appl. No. 18/055,684 dated Dec. 18, 2024, 8 pp.

\* cited by examiner

COMPUTER-BASED SYSTEM TO VALIDATE BUILD INTEGRITY OF SOFTWARE PRODUCTS

This application claims the benefit of U.S. Provisional Patent Application No. 63/147,646, filed Feb. 9, 2021, the entire contents of which is incorporated herein by reference.

TECHNICAL FIELD

This disclosure relates to computer systems and, in particular, computer systems that perform malicious code detection.

BACKGROUND

In software development, computer programmers generate source code to specify the actions to be performed by a computer when executing a software product, e.g., an application or a container, built from the source code. The build process takes source code, including build configuration files and other resources, and produces, through various means, build artifacts. Build artifacts include container images, distribution packages, binaries (e.g., class files, library files, and executables files), source code files (e.g., for interpreted languages such as JavaScript), and associated metadata and resource files.

During the testing and bug fixing portions of the software development process, computer programmers may attempt to detect malicious code or malware within the source code and/or the build artifacts. For example, malicious code detection primarily leverages two approaches: (1) binary analysis in which a computer system scans the binaries for signatures of known bad actors or attacks; and (2) source code analysis in which a computer system analyzes or scans the source code for dangerous coding patterns.

SUMMARY

In general, this disclosure describes a computer system configured to validate build integrity of software products, such as applications or containers. More specifically, this disclosure describes a build integrity validation system that analyzes one or more build artifacts resulting from a software build process of source code to create source code assertions, and compares the assertions against actual data of the source code from which the one or more build artifacts were produced. A "build artifact," as used in this disclosure, includes one or more files produced by a software build process. In examples where the disclosed techniques are applied to a software application, the build integrity validation is based on a comparison of source code of the software application and the resulting build artifacts in the form of distribution packages, binaries (e.g., class files, library files, and executables files), and associated metadata and resource files. In examples where the disclosed techniques are applied to a software container, the build integrity validation is based on a comparison of a container source file of the software container and the resulting build artifact in the form of a container image.

According to the disclosed techniques, the build integrity validation system validates that a particular build artifact is producible by the source code to ensure that no additional code or data was introduced during the software build process. In some examples, the build integrity validation system may additionally, or alternatively, reverse the analysis by creating build artifact assertions from the source code, and comparing the build artifact assertions against the plurality of build artifacts resulting from the software build process of the source code. The reverse analysis validates that the source code is able to produce the plurality of build artifacts to ensure that no code or data of the source code was removed, omitted, or modified during the software build process.

In scenarios where the build integrity validation system identifies at least one discrepancy between at least one build artifact resulting from the software build process of the source code and the actual data of the source code, the build integrity validation system may report or flag the discrepancy to an administrator, e.g., of a build system and/or of the build integrity validation system, for further analysis regarding the cause of the discrepancy. According to the techniques of this disclosure, any malicious code that may have been introduced or any security features that may have been removed or modified during the build process may be identified prior to a software product, e.g., an application or container, being deployed or delivered to a customer or client with an otherwise undetectable security bug or "backdoor."

In one example, this disclosure is directed to a method comprising creating, by a computing system, a data file based on information extracted from at least one build artifact resulting from a software build process of source code, wherein the data file includes one or more assertions with respect to data expected to be included in the source code in order to produce the at least one build artifact; comparing, by the computing system, the one or more assertions in the data file and actual data of the source code; identifying, by the computing system and based on the comparison, whether at least one discrepancy occurs between the one or more assertions in the data file and the actual data of the source code, wherein identifying that the at least one discrepancy occurs comprises identifying at least one assertion created from the at least one build artifact that is not included in the actual data of the source code such that the at least one build artifact is not producible by the actual data of the source code; and in response to identifying the at least one discrepancy, generating, by the computing system, a report indicating the at least one discrepancy between the at least one build artifact and the source code.

In another example, this disclosure is directed to a computing system comprising a memory; and one or more processors in communication with the memory. The one or more processors are configured to create a data file based on information extracted from at least one build artifact resulting from a software build process of source code, wherein the data file includes one or more assertions with respect to data expected to be included in the source code in order to produce the at least one build artifact; compare the one or more assertions in the data file and actual data of the source code; identifying, based on the comparison, whether at least one discrepancy occurs between the one or more assertions in the data file and the actual data of the source code, wherein identifying that the at least one discrepancy occurs comprises identifying at least one assertion created from the at least one build artifact that is not included in the actual data of the source code such that the at least one build artifact is not producible by the actual data of the source code; and in response to identifying the at least one discrepancy, generate a report indicating the at least one discrepancy between the at least one build artifact and the source code.

In another example, this disclosure is directed to a computer-readable storage medium comprising instructions that, when executed, cause one or more processors to create a data file based on information extracted from at least one build artifact resulting from a software build process of source code, wherein the data file includes one or more assertions with respect to data expected to be included in the source code in order to produce the at least one build artifact; compare the one or more assertions in the data file and actual data of the source code; identify, based on the comparison, whether at least one discrepancy occurs between the one or more assertions in the data file and the actual data of the source code, wherein identifying that the at least one discrepancy occurs comprises identifying at least one assertion created from the at least one build artifact that is not included in the actual data of the source code such that the at least one build artifact is not producible by the actual data of the source code; and in response to identifying the at least one discrepancy, generate a report indicating the at least one discrepancy between the at least one build artifact and the source code.

The details of one or more examples are set forth in the accompanying drawings and the description below. Other features, objects, and advantages will be apparent from the description and drawings, and from the claims.

DETAILED DESCRIPTION

Figure 1:
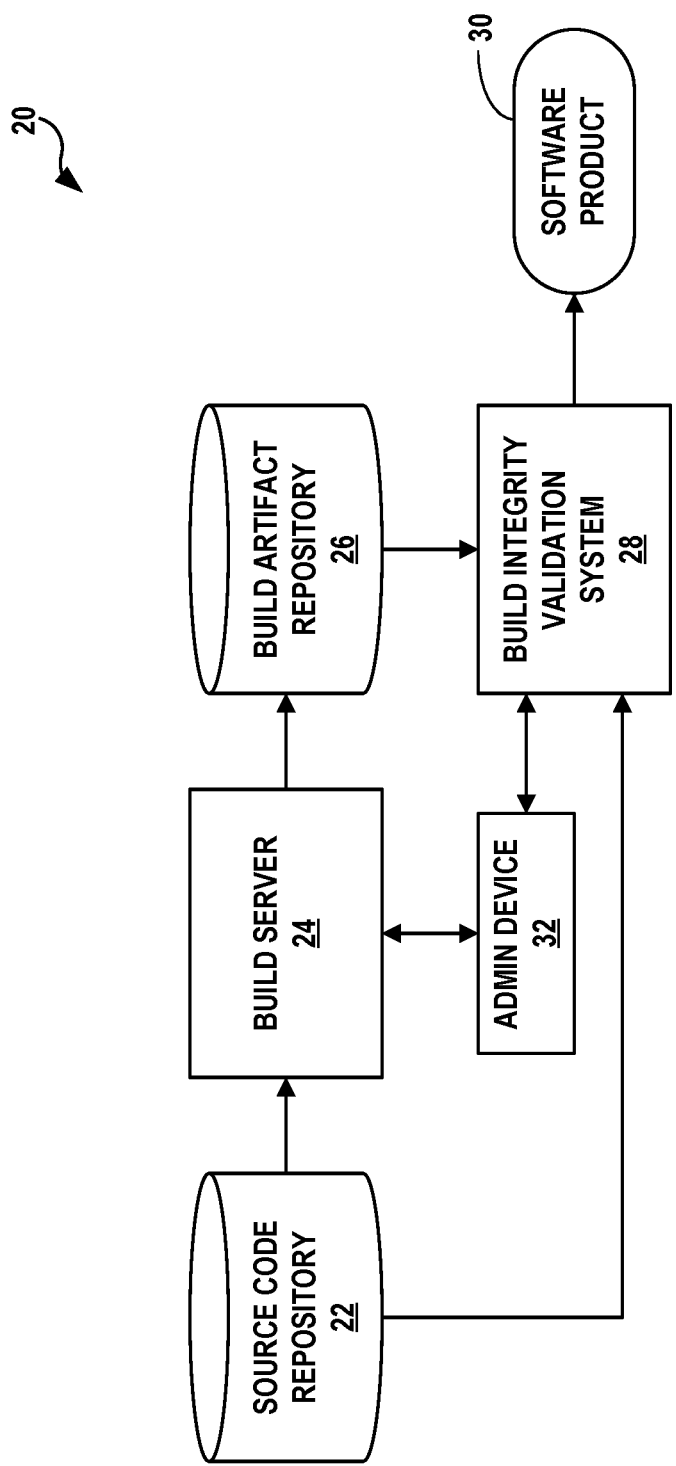
FIG. 1 is a block diagram illustrating an example software product build system including a build integrity validation system configured to compare build artifacts against source code to ensure that no malicious code tampering occurred during the build process, in accordance with the techniques of this disclosure.

FIG. 1 is a block diagram illustrating an example software product build system 20 including a build integrity validation system 28 configured to compare build artifacts against source code to ensure that no malicious code tampering occurred during the build process, in accordance with the techniques of this disclosure. In the illustrated example, build system 20 includes a source code repository 22, a build server 24, a build artifact repository 26, and build integrity validation system 28. Build system 20 outputs a deliverable software product 30 for customers or clients. According to the disclosed techniques, build integrity validation system 28 performs additional malicious code detection to ensure that no malicious code is introduced and/or that no security features are removed or modified during the build process for software product 30.

Source code repository 22 may comprise a database, file archive, and/or hosting facility for source code of software products, such as applications or containers. The source code held in source code repository 22 may include any type of source code (e.g., C Sharp ("C#"), Java, C Plus Plus ("C++"), etc.) that will be compiled, any type of source code (e.g., JavaScript, Java Server Pages, Python) that will be modified, generated, output as is, or otherwise included as a build artifact, build configuration files (e.g., pom.xml, gradle.build, csproject, package-lock.json), any combination of the above packaged within a container source file, and the like. Source code repository 22 may be accessible by build server 20 either privately, in the case of proprietary software projects, or publicly in the case of open source or multi-developer software projects. Although illustrated in FIG. 1 as being directly connected to build server 24, in other examples, source code repository 22 may be accessible by build server 24 via one or more private or public networks that may include a wide area network (WAN) (such as the Internet), a local area network (LAN), a virtual private network (VPN)), or another wired or wireless communication network.

Build server 24 may comprise a centralized, stable, and reliable environment for building software products for distributed development projects in which source code is in received or retrieved from one or more source code repositories, such as source code repository 22. Build server 24 pulls the source code from source repository 22 and transforms the source code into build artifacts. As part of the build process, build server 24 may perform several functions including compiling the source code into binary artifacts, packaging the binaries, and/or running tests prior to deploying or outputting the resulting software product, e.g., software product 30, to customer or client systems. A "build artifact," as used in this disclosure, includes one or more files produced by a software build process. For example, the build artifacts may include container images, distribution packages, binaries (e.g., class files, library files such as dynamic link library (DLL) or shared library (SO) files, and executable files such as WAR, JAR, or EXE files), source code files for interpreted languages (e.g., JavaScript, Python, JSP, ASPX), and associated metadata and resource files that are typically text files (e.g., XML, YAML, etc.).

Build artifact repository 26 may comprise a database, file archive, and/or hosting facility that stores the build artifacts including the container images, binary artifacts, associated metadata, and the like resulting from the build of the source code by build server 24. Build artifact repository 26 may comprise a repository manager configured to manage, version, and store the build artifacts in a defined directory structure of build artifact repository 26. Build artifact repository 26 may be locally or remotely accessible by build server 24. Although illustrated in FIG. 1 as being directly connected to build server 24, in other examples, build artifact repository 26 may be accessible by build server 24 via one or more private or public networks that may include a WAN (such as the Internet), a LAN, a VPN, or another wired or wireless communication network.

Build system 20 may also perform testing and bug fixing as part of the software development process, e.g., using scripts running on build server 24 or another computing device of build system 20. The testing and bug fixing portions may attempt to detect malicious code or malware within the source code received from source code repository 22 and/or the build artifacts received from build artifact repository 26. For example, malicious code detection primarily leverages two approaches: (1) binary analysis in which a computer system scans the binaries for signatures of known malicious code; and (2) source code analysis in which a computer system analyzes or scans the source code for dangerous coding patterns.

Analysis of recent breaches and subsequent subversion of delivered software products indicates that new techniques have been deployed by malicious actors. For example, a new type of malware may subvert the build process by modifying the data of the source code used to build the software application only during the build process. The result is that the malicious code is not present in the source code at the source code repository—i.e., no amount of source code inspection will identify any malicious behavior or dangerous coding patterns-yet a resulting build artifact from the build contains a security bug or backdoor. One potential solution to this issue uses diverse double-compilation in which the source code is compiled on two different operating systems and the resulting two sets of binary artifacts are compared for differences. This solution may add further complexity as different compilers may insert different optimizations such that the two sets of binary artifacts will be different even if no malicious code tampering occurred during one of the builds.

Within the software development lifecycle, development teams may define not only a software application being developed, but also the deployment environment, in its entirety, for the software application. In a simple example, a development team may define a software container in which the software application will run. The term "container," as used in this disclosure, refers to operating system (OS) level virtualization that defines the operating system, the configuration of the operating system, what is installed, and what services should be started when the container is launched. A container image may be considered a build artifact resulting from the software build process of a container source file. More specifically, the container image is the "virtual machine" that can be started as a running software container, e.g., software product 30, that hosts an application.

Container images are generally built in a similar way as any other software build using a build tool, e.g., build server 24. In the example of a Docker container type, the "docker build" command may be used to convert a Dockerfile into a Docker Container Image. A container image is composed as a series of "images" that are layered on top of each other to produce the final container image. Every command in the container source file creates a new image layer that may be independently inspected or started as a running container; however, in most cases only the final image would be started as a running container. In some examples, a first entries in a container source file define one or more existing container images, i.e., "parent" images or "FROM" images, on top of which to start building the current container image. The current container image may inherit commands from the parent image. The parent images may be published in a public repository or a private repository.

As with any system, security is a concern with respect to software containers. Common concerns in the security industry are around standard OS and server hardening and patching issues. When a container starts, conventional approaches include determining whether the container includes components (e.g., OS or other services) that contain publicly known vulnerabilities, such as those published within the National Vulnerability Database (NVD). The conventional approaches also include determining whether the contained operating system is configured securely.

The security gap exposed by the recent breaches and subsequent subversion of delivered software products discussed above may also extend to software containers. For example, a new type of malware may similarly subvert the container build process by modifying the data of the container source file used to build the software container only during the build process. The result is that the malicious code is not present in the container source file at the container source file repository but a resulting container image from the build contains a security bug or backdoor.

The techniques described in this disclosure provide new solutions to ensure that a build artifact resulting from the software build process is producible by the source code in order to detect and protect against this newly used attack technique. In accordance with the disclosed techniques, build integrity validation system 28 is configured to validate the build integrity of software product 30 prior to deploying or delivering software product 30 to a customer or client.

Build integrity validation system 28 may comprise a computing system including one or more computing devices or may be a software product running on one or more computing device of a computing system (not shown in FIG. 1). In some examples, the computing system executing build integrity validation system 28 may be implemented as any suitable computing system, such as one or more server computers, workstations, mainframes, appliances, cloud computing systems, and/or other computing systems that may be capable of performing operations and/or functions described in accordance with one or more aspects of the present disclosure.

In the illustrated example of FIG. 1, build integrity validation system 28 does not include build server 24 and validation system 28 is not executed on build server 24. This separation may be beneficial, for example, in the case where a malicious actor has compromised build server 24 such that both the build tools and analysis tools running on build server 24 may be subverted. In this example, build integrity validation system 28 comprises an independent, secure system used for the analysis. In other examples, build integrity validation system 28 may include or be executed on a build server, such as build server 24.

Build integrity validation system 28 retrieves the source code from source code repository 22, obtains one or more build artifacts from build artifact repository 26, and performs the analysis to ensure the one or more build artifacts are producible by the given source code. If build integrity validation system 28 identifies discrepancies between the one or more build artifacts and the source code, the discrepancies may be flagged or reported to an administrator (admin) device 32 of build system 20 and/or build integrity validation system 28 and analyzed to determine if each identified discrepancy is non-malicious or malicious. One non-malicious scenario may occur due to code generation that occurs during the build process; such generated code may not exist in source code repository 22 and may be identified as a discrepancy.

More specifically, build integrity validation system 28 analyzes build artifacts from build artifact repository 26 to create one or more source code assertions, and compares the one or more source code assertions against actual data of the source code in source code repository 22 from which the build artifacts in build artifact repository 26 were produced during the build process on build server 24. In examples where software product 30 is a software application, build integrity validation system 28 is configured to compare source code of the software application from source code repository 22 and the resulting build artifacts in build artifact repository 26 in the form of distribution packages, binaries, and associated metadata and resource files. In examples where software product 30 is a software container, build integrity validation system 28 is configured to compare a container source file in of the software container from source code repository 22 and the resulting build artifact in build artifact repository 26 in the form of a container image.

According to the disclosed techniques, build integrity validation system 28 validates that a particular build artifact is producible by the source code to ensure that no additional code or data was introduced during the build process. In some examples, build integrity validation system 28 may additionally, or alternatively, reverse the analysis by creating build artifact assertions from the source code received from source code repository 22, and comparing the build artifact assertions against the plurality of build artifacts in build artifact repository 26 resulting from the build process of the source code in source code repository 22 by build server 24. The reverse analysis validates that the source code is able to produce the plurality of build artifacts to ensure that no code or data of the source code was removed, omitted, or modified during the build process.

In some examples, build integrity validation system 28 may be used to validate build integrity of software product 30 as a software application by creating one or more source code assertions that the source code is expected to include definitions of one or more software components extracted from build artifacts in build artifact repository 26 resulting from the software build process of the source code at build server 24. The software components extracted from the build artifact may include object names, method names, instructions included within methods, constants, and/or text files. Build integrity validation system 28 compares each source code assertion against definitions of software components in the actual data of the source code from source code repository 22. In this example, build integrity validation system 28 may identify at least one source code assertion created from a build artifact that does not match the definitions of software components in the actual data of the source code such that the build artifact is not producible by the actual data of the source code, and generate a report indicating the discrepancy between the build artifact and the source code.

In other examples, build integrity validation system 28 may be used to validate build integrity of software product 30 as a software container by creating a container image history file including one or more source code assertions that the container source file is expected to include commands extracted from a container image in build artifact repository 26 resulting from the software build process of the container source file at build server 24. Build integrity validation system 28 then compares each source code assertion in the container image history file against commands in the actual data of the container source file from source code repository 22. In this example, build integrity validation system 28 may identify at least one source code assertion created from the container image that does not match the commands in the actual data of the container source file such that the container image is not producible by the actual data of the container source file, and generate a report indicating the discrepancy between the container image and the container source file.

Build integrity validation system 28 identifies discrepancies between one or more build artifacts in build artifact repository 26 resulting from the software build process of the source code on build server 24 and the actual data of the source code in source code repository 22. Build integrity validation system 28 may report or flag the discrepancy to admin device 32 of build system 20 and/or build integrity validation system 28, for further analysis regarding the cause of the discrepancy. Admin device 32 may be associated with one or more human administrators of build system 20 and/or build integrity validation system 28. Admin device 32 may comprise any suitable communication or computing device, such as a laptop or notebook computer, desktop computer, a smart phone or tablet, or any other type of computing device capable of communicating with build integration validation system 28 and/or build server 24 either directly or over a network.

Admin device 32 may receive reports from build integration validation system 28 that indicate discrepancies identified between the build artifacts resulting from the software build process of the source code on build server 24 and the actual data of the source code. Admin device 32 may further analyze the discrepancies that occurred during the build process on build server 24 in order to determine a cause of each discrepancy. In some cases, one or more particular discrepancies may be due to compiler optimization performed by build server 24 or another benign factor. A human administrator using admin device 32 or an automated program or system running on admin device 32 may be able to identify and disregard these particular discrepancies. Admin device 32 may then determine whether the remaining discrepancies are the result of malicious code being introduced during the build process on build server 24 and/or the result of portions of the actual data of the source code that define security features being removed or modified during the build process. In this way, build integrity validation system 28 may identify any malicious tampering during the build process that may result in an otherwise undetectable security bug or backdoor being included in software product 30 deployed or delivered to the customer or client.

Figure 2A:
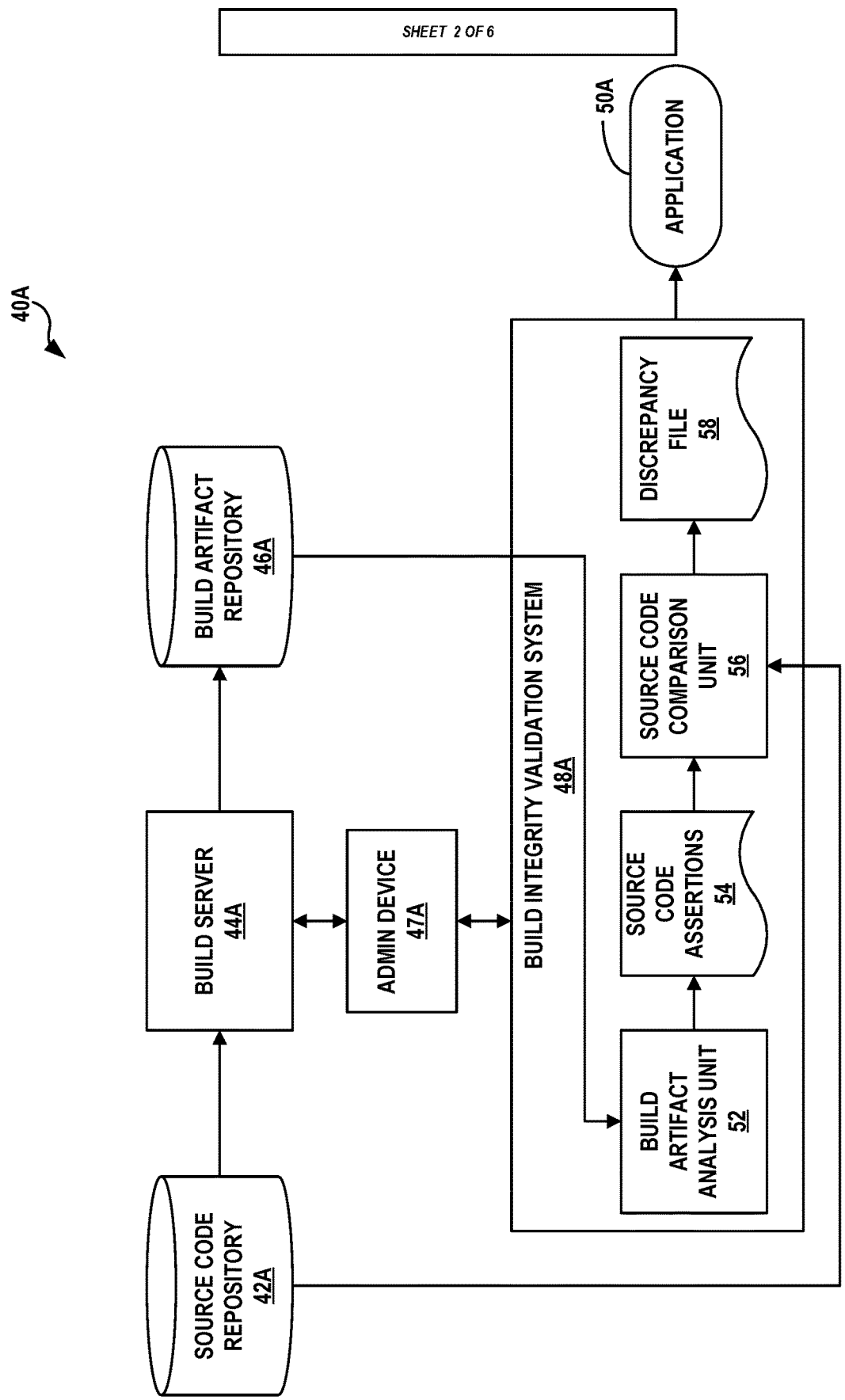
FIG. 2A is a block diagram illustrating an example build integrity validation system configured to compare build artifacts against source code for a software application.

FIG. 2A is a block diagram illustrating an example build system 40A including an example build integrity validation system 48A configured to compare build artifacts against source code for a software application 50A. Build integrity validation system 48A may ensure that no malicious code was introduced during the build process of the source code for software application 50A. Build system 40A may operate substantially similar to build system 20 of FIG. 1.

More specially, FIG. 2A illustrates a comparison of source code assertions 54 created from the plurality of build artifacts resulting from the build process of the source code at build server 44A against the actual data of the source code. In this way, the comparison of FIG. 2A may be used to identify one or more additional build artifacts in the plurality of build artifacts that could not have been produced by the actual data in the source code.

In some examples, the comparison of FIG. 2A may be performed as a stand-alone comparison applied to source code and resulting build artifacts from the build process of the source code. In other examples, the comparison of FIG. 2A may be performed as an initial or "forward" comparison that may be followed by a subsequent or "reverse" comparison in order to identify both potentially added code or data and potentially removed code or data during the build process of the source code. In one particular use case, in response to the forward comparison of FIG. 2A identifying no discrepancies between the source code assertions and the actual data of the source code, a reverse comparison may be performed in which build artifact assertions created from the source code are compared against the plurality of build artifacts resulting from the build process of the source code at build server 44A. One example of a "reverse" comparison is described in more detail below with respect to FIG. 2B.

Build integrity validation system 48A includes a build artifact analysis unit 52 that receives a build artifact of a plurality of build artifacts from build artifact repository 46A, extracts software components from the build artifact, and creates one or more source code assertions 54 based on the extracted software components from the build artifact. More specifically, build artifact analysis unit 52 may analyze build artifacts from a build, e.g., WAR, JAR, DLL, and EXE files, to create source code assertions 54 about the source code required to produce the build artifacts. Source code assertions 54 may be used to validate that each of the build artifacts is producible by a given set of source code-ensuring the integrity of the build process and the build artifact.

For example, build artifact analysis unit 52, performed on a compiled binary artifact, may extract one or more software components, such as object names, method names, instructions included within a given method, constants, or the like, from the binary artifact. The extracted software components may be converted into source code assertions 54. Build artifact analysis unit 52 may create a data file including one or more source code assertions 54 that the source code includes definitions of the one or more object names, method names, instructions included within a given method, constants, or the like, extracted from the binary artifact. For example, build artifact analysis unit 52 may create an assertion that the source code is expected to include a specific definition of a method that uses a given set of instructions. As another example, build artifact analysis unit 52, performed on interpreted source code or other resource artifact, may extract one or more text files from the build artifacts, and create one or more source code assertions 54 that the source code includes files having the same content as the text files extracted from the resource artifact. The number and type of assertions and depth of analysis performed may vary depending on the type of build artifact and source code.

Build server 44A may generate several types of software components that are referred to as build artifacts. Some of these software components are binary (e.g., class files, JARs, DLLs, SOs), some are text (e.g., XML, YAML, JSP, ASPX), etc. Build artifact analysis unit 52 may create different types of source code assertions 54 depending on the type of build artifact produced by the build process at build server 44A.

For the build artifacts that are text files, one simple assertion that may be created by build artifact analysis unit 52 is that a file contained in the source code has the same SHA-512 digest as the text file found in the build artifacts. Another example of an assertion that may be created by build artifact analysis unit 52 for build artifacts that are text files is that the source code contains one or more files that make up the content of the build artifact; this is common when multiple JavaScript files are concatenated together into a single build artifact. Many binary files have well documented structures. For instance, a JAR file may be one of the build artifacts for a Java build. A JAR file is based on the ZIP file format and contains a documented set of files and directories. The files within a JAR may include binary class files, resource files (Properties, XML, YAML, text files and even other binary files (e.g., images, executables), etc.). When analyzing a JAR file to generate assertions, build artifact analysis unit 52 may use different techniques depending on the contained file. One of the import files within a JAR file that may be used to generate source code assertions 54 is the class file, which is generated by compiling Java source code.

A class file is a well-documented binary format that follows the below structure:

```
ClassFile {
    u4              magic;
    u2              minor_version;
    u2              major_version;
    u2              constant_pool_count;
    cp_info         constant_pool[constant_pool_count-1];
    u2              access_flags;
    u2              this_class;
    u2              super_class;
    u2              interface_count;
    u2              interfaces[interface_count];
    u2              fields_count;
    field_info      fields[fields_count];
    u2              methods_count;
    method_info     methods[methods_count];
    u2              attributes_count;
    attribute_info  attributes[attributes_count];
}
```

By parsing the class file, build artifact analysis unit 52 extracts constants (e.g., integers, strings), the fully qualified name of the class, the fields and methods defined in the class, the instructions for each method, etc. Build artifact analysis unit 52 may then generate source code assertions 54 by analyzing the class file structure. For instance, if a specific class file has a fully qualified name of "org.example.App" and it contains a single method named "helloWorld," build artifact analysis unit 52 may create an assertion that there is an App.java file that defines the App class in the "org.example" package that contains a single method "helloWorld." Build artifact analysis unit 52 may also create another source code assertion 54 that the "helloWorld" method does not have any annotations. Build artifact analysis unit 52 may assert that the "helloWorld" method has zero parameters. Build artifact analysis unit 52 may assert that the "helloWorld" method calls "java.io.PrintStream.println( )". Build artifact analysis unit 52 may assert that the "helloWorld" method references a single constant "Hello World". Build artifact analysis unit 52 may generate numerous other types of assertions.

While it may be possible to extract the exact instruction set from the build artifacts, the exact instruction set still may not match one-to-one with the actual data of the source code. One factor leading to this discrepancy is compiler optimization. In some cases, the discrepancies may be expected due to code generators that are a standard part of the build. In other cases, however, the discrepancies may identify malicious instructions that have been injected into the build artifact during the build process at build server 44A. Build integrity validation system 48A and source code assertions 54 created by build artifact analysis unit 52 may ensure that additional code or data injected into build server 44A that deviates from the source code will be identified and flagged. Build artifact analysis unit 52 may generate a reasonable number of source code assertions to increase confidence that a given build artifact is producible from a given set of source code.

Build integrity validation system 48A also includes source code comparison unit 56 that receives source code from source code repository 42A, compares each source code assertion of source code assertions 54 created from a build artifact against the actual data of the source code, and determines, based on the comparison, whether the build artifact is producible by the actual data of the source code. In order to determine that the build artifact is producible by the source code, source code comparison unit 56 determines that source code assertions 54 created from the plurality of binary artifacts produced during the software build process at build server 44A match the one or more definitions of software components in the actual data of the source code, which indicates that no additional code or data was introduced during the software build process of the source code at build server 44A. Based on the validation that the plurality of build artifacts in build artifact repository 46A are producible by the actual data of the source code from source code repository 42A, build integrity validation system 48A may enable deployment or delivery of software application 50A to a customer or client.

In order to determine that the build artifact is not producible by the source code, source code comparison unit 56 identifies that at least one discrepancy occurs between source code assertions 54 and the actual data of the source code by identifying at least one source code assertion created from the build artifact that does not match the one or more definitions of software components in the actual data of the source code. Source code comparison unit 56 stores the identified discrepancy in discrepancy file 58. Build integrity validation system 48A may generate a report indicating the identified discrepancy between the build artifact and the source code. In some examples, build integrity validation system 48A may generate a notification indicating that additional code or data was potentially introduced during the software build process of the source code at build server 44A that produced the build artifact. Build integrity validation system 48A may send the report and/or the notification to admin device 47A.

The following is an example analysis, e.g., by build artifact analysis unit 52, of a build artifact JavaScript file and one type of source code assertion that could be produced. The source code assertions are in plain English.
 1. A JavaScript file called "jquery-3.5.1.js" exists in the source code and the file has a SHA-256 digest of "QWo7LDvxbWT2tbbQ97B53yJnYU3WhH/C8ycbRAkjPDc=".

The following is an example analysis, e.g., by build artifact analysis unit 52, of a build artifact class file, i.e., Sample.class, and the resulting source code assertions. The source code assertions are in plain English followed by an example expressed as a Microfocus Fortify SCA rule.
 1. Class Definition: A class definition exists in the source code that ensures a class is defined called "org.codesecure.build.integrity.Sample" and contains the definition of a constructor and a method called "helloWorld." The assertion flags the definition of a class "Sample", in the "org.codesecure.build.integrity" package, that does not define the "helloWorld" method and a constructor. The assertion could be expressed using the following Fortify SCA rule:
  <StructuralRule formatVersion= "19.2" language= "java">
   <RuleID>CE682799-5BA3-4A40-989B-A8EC1CBB5609</RuleID>
   <VulnCategory>Class Definition</VulnCategory>
   <VulnSubcategory>org.codesecure.build.integrity.Sample</VulnSubcategory>
   <DefaultSeverity>3.0</DefaultSeverity>
   <Description><Abstract>Ensures that Sample.java defines a constructor and the helloWolrd method</Abstract></Description>
   <Predicate><! [CDATA [
    Class sample: sample.name== "org.codesecure.build.integrity.Sample"
    and not (sample.functions contains [Function init: init.name== "Sample"]
    and sample.functions contains [Function helloWorld: helloWorld.name== "helloWorld"])
   ]]></Predicate>
  </StructuralRule>
 2. Method Definition: A class named "org.jcodesecure.build.integrity.Sample" exists in the source code that defines a method called "helloWorld" that makes a call to "java.io.PrintStream." The assertion flags any instances of the helloWorld method within the Sample class that do not call java.io.PrintStream( ) The assertion could be expressed using the following Fortify SCA rule:
  <StructuralRule formatVersion= "19.2" language= "java">
   <RuleID>21E3F09B-64CF-48CB-967A-0A5211BEF20F</RuleID>
   <VulnCategory>Method Definition</VulnCategory>
   <VulnSubcategory>Sample.helloWorld</VulnSubcategory>
   <DefaultSeverity>3.0</DefaultSeverity>
   <Description><Abstract>Ensure that Sample.helloWorld calls
  java.io.PrintStream.println ( )/Abstract></Description>
   <Predicate><! [CDATA [
    Class sample: sample.name== "org.codesecure.build.integrity.Sample"
    and app.functions contains [Function helloWorld: helloWorld.name== "helloWorld" and not (helloWorld.callees contains
    [Function f1: f1.name== "println" and f1.enclosingClass.name== "java.io.PrintStream"])]*
   ]]></Predicate>
  </StructuralRule>

If the example assertions set forth above were used on the following source code, source code comparison unit 56 may find that the source code below matches the assertions.
 package org.codesecure.build.integrity;
 public class Sample {
  public Sample( ) {
  }
  public void helloWorld ( ) {
   System.out.println ("Hello World!");
  }
 }

However, if build artifact analysis unit 52 analyzed Sample class and generated an assertion that stated that the "helloWorld" method contained calls to "java.io.PrintStream.println( )" and "java.lang.Runtime.exec( )" and source code comparison unit 56 analyzed the same source code above, the "helloWorld" method may be identified as a discrepancy as the source code does not include a call to java.lang.Runtime.exec( ) In other scenarios, the above examples may be further expanded to include greater specificity to ensure the assertions take into account modifiers (such as public, private, etc.), method parameters, and the like.

A concrete example is outlined above using rules for a commercial Static Application Security Testing (SAST) tool. It should be noted, however, that the assertions could be implemented in other types of analysis tools to validate that a given build artifact is producible by the source code.

The following source code assertions 54 are examples that could be generated by build artifact analysis unit 52, however, other types of assertions may also be created.

1. A binary build artifact may define an object/class that includes ten methods. Build artifact analysis unit 52 may generate source code assertions 54 to ensure the actual data of the source code includes the definition of the object/class and that the definition of the object/class contains the declaration of the ten methods. If the definition of the object/class in the source code does not exist or does not include the declaration of all ten methods within the assertion created from a build artifact, then the build artifact is not producible by the actual data of the source code. There may be exceptions to this case depending on the language/technologies used—for instance, a Java binary class file may include an "empty" constructor that might not exist in the source code. Build artifact analysis unit 52 may account for this expected scenario in the creation of source code assertions 54.
2. A binary build artifact may contain a method that uses six specific constant strings. Build artifact analysis unit 52 may generate source code assertions 54 to ensure that the actual data of the source code includes the definition of the method and that the definition of the method uses the six specific constant strings. If the definition of the method in the source code does not include all of the constant strings identified within the assertion created from a build artifact, then the build artifact is not producible by the actual data of the source code.
3. A binary build artifact may contain a method that calls five other methods. Build artifact analysis unit 52 may generate source code assertions 54 to ensure that the actual data in the source code includes the definition of the method and that the definition of the method calls the five other methods. If the definition of the method in the source code does not call all of the five other methods identified within the assertion created from a build artifact, then the build artifact is not producible by the actual data of the source code.

Figure 2B:
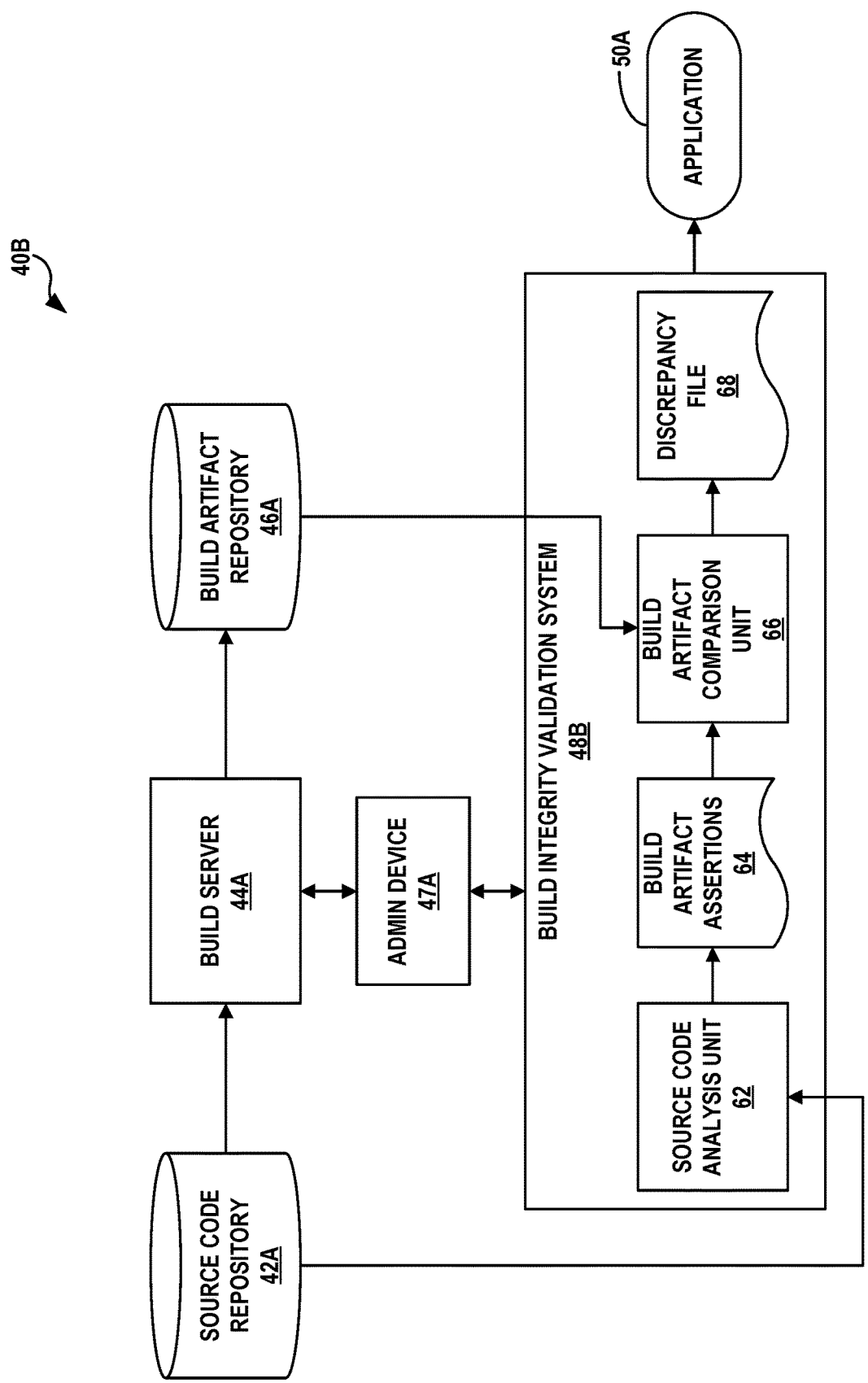
FIG. 2B is a block diagram illustrating another example build integrity validation system configured to perform a comparison of source code against build artifacts for a software application.

FIG. 2B is a block diagram illustrating an example build system 40B including another example build integrity validation system 48B configured to perform a comparison of source code against build artifacts for software application 50A. Build integrity validation system 48B may ensure that no security features were removed or modified during the build process of the source code for software application 50A. Build system 40B may operate substantially similar to build system 20 of FIG. 1.

The comparison illustrated in FIG. 2B may be considered a "reverse" comparison with respect to the "forward" comparison illustrated in FIG. 2A. More specifically, FIG. 2B illustrates a comparison of build artifact assertions created from source code against the plurality of build artifacts resulting from the build process of the source code at build server 44A. In this way, unlike the comparison of FIG. 2A used to identify one or more additional build artifacts in the plurality of build artifacts that could not have been produced by the actual data in the source code, the reverse comparison of FIG. 2B may identify one or more missing build artifacts in the plurality of build artifacts that should have been produced by the actual data of the source code.

In some examples, the reverse comparison of FIG. 2B may be performed as a stand-alone comparison applied to source code and resulting build artifacts from the build process of the source code. In other examples, the reverse comparison of FIG. 2B may be performed in addition to the forward comparison of FIG. 2A in order to identify both potentially added code or data and potentially removed code or data during the build process of the source code. In one particular use case, the reverse comparison of FIG. 2B may be performed in response to the forward comparison of FIG. 2A identifying no discrepancies between the source code assertions and the actual data of the source code.

Build integrity validation system 48B includes a source code analysis unit 62 that receives source code from source code repository 42A, extracts definitions of software components from the source code, and creates build artifact assertions 64 based on the extracted definitions of the software components from the source code. For example, source code analysis unit 62 may extract one or more definitions of object names, method names, instructions included within a given method, and constants from the source code. Source code analysis unit 62 may then create a data file including one or more binary artifact assertions 64 that the plurality of build artifacts is expected to include one or more object names, method names, instructions included within a given method, or constants of the one or more definitions extracted from the source code.

Build integrity validation system 48B also includes build artifact comparison unit 66 that receives the plurality of build artifacts from build artifact repository 46A, compares build artifact assertions 64 created from the source code against the plurality of build artifacts, and determines, based on the comparison, whether the source code is able to produce the plurality of build artifacts. In order to determine that the source code is able to produce the plurality of build artifacts, build artifact comparison unit 66 determines that build artifact assertions 64 match the one or more software components included in the plurality of build artifacts, which indicates that no portion of the source code was removed or modified during the software build process of the source code at build server 44A. Based on the validation that the actual data of the source code from source code repository 42A is able to product the plurality of build artifacts in build artifact repository 46A, build integrity validation system 48B may enable deployment or delivery of software application 50A to a customer or client.

In order to determine that the source code is unable to produce the plurality of build artifacts, build artifact comparison unit 66 identifies that at least one discrepancy occurs between build artifact assertions 64 and the plurality of build artifact by identifying at least one binary artifact assertion created from the source code that does not match the one or more software components included in the plurality of build artifacts. Build artifact comparison unit 66 stores the identified discrepancy in discrepancy file 68. Build integrity validation system 48B may generate a report indicating the identified discrepancy between the source code and the plurality of build artifacts. In some examples, build integrity validation system 48B may generate a notification indicating that a portion of the actual data of the source code was potentially removed or modified during the software build process of the source code at build server 44A that produced the plurality of build artifacts. Build integrity validation system 48B may send the report and/or the notification to admin device 47A.

Figure 2C:
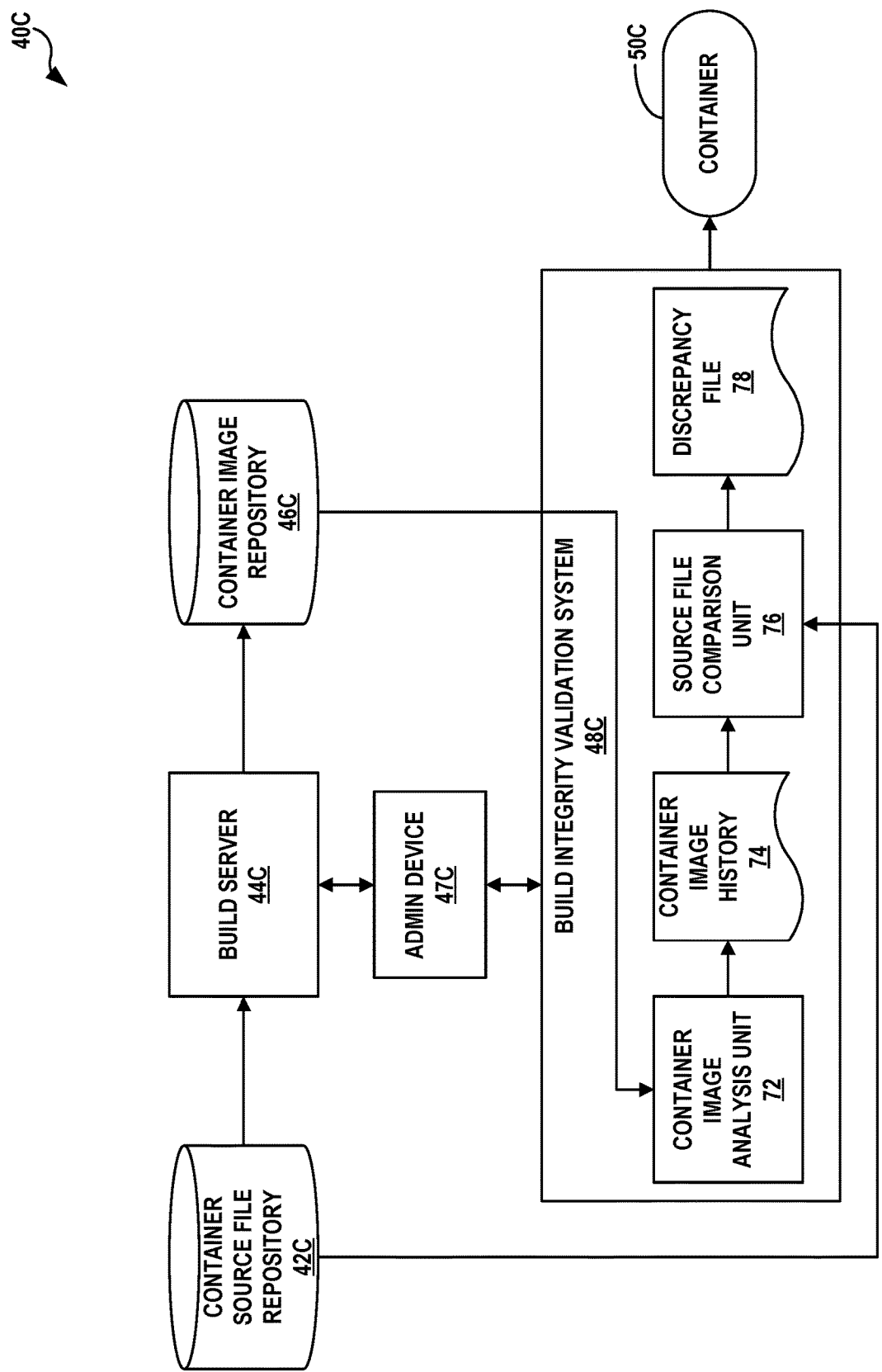
FIG. 2C is a block diagram illustrating another example build integrity validation system configured to compare a container image against a container source file for a software container.

FIG. 2C is a block diagram illustrating an example build system 40C including another example build integrity validation system 48C configured to compare a container image against a container source file for a software container 50C.

Build integrity validation system 48C may ensure that no malicious code was introduced during the build process of the container source file for software container 50C. Build system 40C may operate substantially similar to build system 20 of FIG. 1.

More specially, FIG. 2C illustrates a comparison of source code assertions included in a container image history file 74 created from a container image resulting from the build process of the container source file at build server 44C against the actual data of the container source file. In this way, the comparison of FIG. 2C may be used to identify one or more additional commands used to build the container image that are not included in the actual data of the container source file such that the container image could not have been produced by the container source file.

Build integrity validation system 48C includes a container image analysis unit 72 that receives a container image from container image repository 46C, extracts a history of how the container image was built during the build process at build server 44C, and creates a container image history file 74 including one or more source code assertions based on the extracted history of the container image. For example, container image analysis unit 72 may extract the history of one or more commands executed to build the container image from the container image. Container image analysis unit 72 may then create container image history file 74 including one or more source code assertions that the container source file is expected to include the one or more commands extracted from the container image.

Example applications of build integrity validation system 48C are described in this discloser with respect to Docker containers. Similar techniques may be performed on other container types and the disclosure should not be so limited. Part of a Docker container image is the history of how it was built. As such, an initial starting point is to ensure that the commands in container image history file 74 match what was in the Dockerfile, i.e., the container source file of the Docker container. An example Dockerfile for OWASP dependency-check version 6.2.2 follows:

```
01 FROM golang: 1.16-alpine AS go
02
03 FROM azul/zulu-openjdk-alpine: 14 AS jlink
04
05 RUN "$JAVA_HOME/bin/jlink"—compress=2—
   module-path/opt/java/openjdk/jmods . . . .
06
07 FROM mcr.microsoft.com/dotnet/runtime: 3.1-al-
   pine3.12
08
09 ARG VERSION
10 ARG POSTGRES_DRIVER_VERSION=42.2.19
11 ARG MYSQL_DRIVER_VERSION=8.0.23
12 ARG UID=1000
13 ARG GID=1000
14
15 ENV user=dependencycheck
16 ENV JAVA_HOME=/opt/jdk
17 ENV JAVA_OPTS="-Danalyzer.assembly.dotnet-
   .path=/usr/bin/dotnet . . .
18
19 COPY—from=jlink/jlinked/opt/jdk/
20 COPY—from=go/usr/local/go//usr/local/go/
21
22 ADD cli/target/dependency-check-$ {VERSION}-re-
   lease.zip/
23
24 RUN apk update
25 apk add—no-cache—virtual.build-deps curl tar
26 apk add—no-cache git ruby ruby-rdoc npm
27 gem install bundle-audit
28 bundle audit update
29 mkdir/opt/yarn
30 curl-Ls https://yarnpkg.com/latest.tar.gz | tar-xz—
   strip-components=1—directory/opt/yarn
31 ln-s/opt/yarn/bin/yarn/usr/bin/yarn
32 unzip dependency-check-$ {VERSION}-release.zip-
   d/usr/share/
33 rm dependency-check-$ {VERSION}-release.zip
34 cd/usr/share/dependency-check/plugins
35 curl-Os "https://jdbc.postgresql.org/download/postgr-
   esql . . . .
36 curl-Ls "https://dev.mysql.com/get/Downloads/Con-
   nector-J/mysql-connector-java . . . .
37 | tar-xz—directory "/usr/share/dependency-check/pl-
   ugins" . . . .
38 "mysql-connector-java-$ {MYSQL_DRIVER_VER-
   SION}/mysql-connector . . . .
39 addgroup-S-g $ {GID} $ {user} && adduser-S-D-u $
   {UID}-G $ {user} $ {user}
40 mkdir/usr/share/dependency-check/data
41 chown-R $ {user}: 0/usr/share/dependency-check
42 chmod-R g=u/usr/share/dependency-check
43 mkdir/report
44 chown-R $ {user}: 0/report
45 chmod-R g=u/report
46 apk del.build-deps
47
48 ###remove any suid sgid-we don't need them
49 RUN find/-perm+6000-type f-exec chmod a-s { } \;
50 USER $ {UID}
51
52 VOLUME ["/src", "/report"]
53
54 WORKDIR/src
56 CMD ["—help"]
57 ENTRYPOINT ["/usr/share/dependency-check/bin/
   dependency-check.sh"]
```

In the example of FIG. 2C, build server 44C performs a build process of the above Dockerfile to create a resulting Docker image, which is stored in container image repositor 46C. According to the disclosed techniques, container image analysis unit 72 receives the Docker image from container image repository 46C and extracts the history of one or more commands executed to build the Docker image by running:

```
docker pull owasp/dependency-check: 6.2.2
docker history—no-trunc owasp/dependency-check:
   6.2.2>imageHistory.txt
```

Container image analysis unit 72 creates container image history file 74 as a text file that includes one or more source code assertions that the Dockerfile is expected to include the one or more commands extracted from the Docker image. Container image analysis unit 72 also stores the layers of the Docker image to a tar file by running:

```
docker save owasp/dependency-check: 6.2.2>container-
   .tar
```

An example of the container image history file 74 created from the Docker image of OWASP dependency-check version 6.2.2 follows, some of the entries are truncated for readability:

```
01 CREATED BY
02/bin/sh-c #(nop) ENTRYPOINT ["/usr/share/depen-
   dency-check/bin/dependency-check.sh"]
03/bin/sh-c #(nop) CMD ["—help"]
04/bin/sh-c #(nop) WORKDIR/src
```

05 /bin/sh -c #(nop) VOLUME [/src/report]
06 /bin/sh -c #(nop) VOLUME [/src/report]
07 | 5 GID=1000 MYSQL_DRIVER_VERSION=8.0.23 POSTGRES_DRIVER_VERSION=42.2.19 . . . .
08 | 5 GID=1000 MYSQL_DRIVER_VERSION=8.0.23 POSTGRES_DRIVER_VERSION=42.2.19 . . . .
09 /bin/sh -c #(nop) ADD file: 89ee4549f94dc0df0cf4215f5372a6693c482780d14cf7 286502e997 . . .
10 /bin/sh -c #(nop) COPY dir: 400fe633deccfe7b819f14611ba2141da551523e2965a2 0185332e5 . . .
11 /bin/sh -c #(nop) COPY dir: 5d5d6611e2dd91ecd04f6337e3914158a1dc33c748cdf 6f24f5c386 . . .
12 /bin/sh -c #(nop) ENV JAVA_OPTS=-Danalyzer.assembly.dotnet.path=/usr/bin/dotnet . . . .
13 /bin/sh -c #(nop) ENV JAVA_HOME=/opt/jdk
14 /bin/sh -c #(nop) ENV user=dependencycheck
15 /bin/sh -c #(nop) ARG GID=1000
16 /bin/sh -c #(nop) ARG UID=1000
17 /bin/sh -c #(nop) ARG MYSQL_DRIVER_VERSION=8.0.23
18 /bin/sh -c #(nop) ARG POSTGRES_DRIVER_VERSION=42.2.19
19 /bin/sh -c #(nop) ARG VERSION
20 /bin/sh -c dotnet_version=3.1.16 && wget -O dotnet-.tar.gz https://dotnetcli.azureedge.net . . . .
21 /bin/sh -c #(nop) ENV ASPNETCORE_URLS=http://+:80 DOTNET_RUNNING_IN_CONTAINER=t . . . .
22 /bin/sh -c apk add—no-cache ca-certificates krb5-libs libgcc libintl . . . .
23 /bin/sh -c #(nop) CMD ["/bin/sh"]
24 /bin/sh -c #(nop) ADD file: 4f526aa99067d82b341f7ca538f7826b7c23a628f1b61 5eea2883a2 . . . .

Build integrity validation system 48C includes source file comparison unit 76 that receives the container source file from container source file repository 42C, compares each source code assertion in container image history file 74 created from the container image against one or more commands in the actual data of the container source file, and determines, based on the comparison, whether the container image is producible by the actual data of the container source file.

Returning to the above example of the container OWASP dependency-check version 6.2.2, source file comparison unit 76 compares the container image history file 74 created from the Docker image and the Dockerfile from container source file repository 42C to ensure that no steps or commands were added during or just prior to the build process at build server 44C such that the Docker image is correct and matches the Dockerfile. To compare the files, source file comparison unit 76 compares each source code assertion of the one or more source code assertions read entry-by-entry from top-down in container image history file 74 against each command of the one or more commands read entry-by-entry from bottom-up in the Dockerfile.

As shown in the above examples of the Dockerfile and the image history file of the Docker image, line 57 in the Dockerfile (ENTRYPOINT ["/usr/share/dependency-check/bin/dependency-check.sh "]) defines the entry point and line 2 in the image history file (/bin/sh -c #(nop) ENTRYPOINT ["/usr/share/dependency-check/bin/dependency-check.sh "]) contains the same entry point. Every row in the container image history file 74 of the Docker image corresponds to an entry in the Dockerfile. As illustrated in the above examples, there may be many more lines in the Dockerfile than in the image history file, which is caused by comments, whitespace, and multi-line commands (e.g., lines 24-46 in the Dockerfile correspond to line 8 in the image history file of the Docker image).

When a source code assertion at a given entry in container image history file 74 does not match a command at a corresponding entry in the actual data of the container source file, source file comparison unit 76 may determine that the corresponding step in the actual data of the container source file is a reference to a second container image. In some examples, the second container image may be an existing image, i.e., a "parent" image or "FROM" image, on top of which the current container image is built. Build integrity validation system 48C may access the second container image from a public repository or a private repository, and container image analysis unit 72 may create a second container image history file including one or more commands executed to build the second container image. Source file comparison unit 76 may then compare the source code assertion at the given entry in the initial container image history file 74 against the one or more commands in the second container image history file of the second container image. Source file comparison unit 76 determines, based on the comparison, whether the container image is producible by the actual data of the container source file including the reference to the second container image.

In the above example of the container OWASP dependency-check version 6.2.2, line 20 of container image history file 74 of the Docker image includes a long "created by" entry that does not appear in the Dockerfile. The full version of line 20 is as follows:

/bin/sh -c dotnet_version=3.1.16 && wget -O dotnet.tar.gz
https://dotnetcli.azureedge.net/dotnet/Runtime/$dotnet_version/dotnet-runtime-$dotnet_version-linux-musl-x64.tar.gz &&
dotnet_sha512='74cbf5617c9c5d6a0d371db3fe2af10b89 d7f0328c9e0db40015b0ed1d2092 126b7f831134fb0a7c8557627f6d6597de886e885e8b8 c4f5c6a9e109b5fcdb92e' && echo "$dotnet_sha512 dotnet.tar.gz" | sha512sum -c -&& mkdir -p /usr/share/dotnet && tar -C /usr/share/dotnet -oxzf dotnet.tar.gz && ln -s /usr/share/dotnet/dotnet/usr/bin/dotnet && rm dotnet.tar.gz Line 20 of container image history file 74 of the Docker image should correspond to line 7 in the Dockerfile. Line 7 in the Dockerfile defines another container image used in building the Docker image from the Dockerfile, as follows:

FROM mcr.microsoft.com/dotnet/runtime: 3.1-alpine3.12

According to the disclosed techniques, build integrity validation system 48C may download the second container and extract the image history by running:

docker pull mcr.microsoft.com/dotnet/runtime: 3.1-alpine3.12
docker history—no-trunc mcr.microsoft.com/dotnet/runtime: 3.1-alpine3.12 >
dotnetHistory.txt An example of the image history file of the dotnet/runtime: 3.1-alpine3.12 container follows, some of the entries are truncated for readability:

01 CREATED BY
02 /bin/sh -c dotnet_version=3.1.16 && wget -O dotnet-.tar.gz https://dotnetcli.azureedge.net . . . .

03 /bin/sh -c    #(nop)    ENV ASPNETCORE_URLS=http://+: 80 DOTNET_RUNNING_IN_CONTAINER=t . . . .
04 /bin/sh -c apk add—no-cache ca-certificates krb5-libs libgcc libintl . . .
05 /bin/sh -c #(nop) CMD ["/bin/sh"]
06    /bin/sh -c    #(nop)    ADD    file: 4f526aa99067d82b341f7ca538f7826b7c23a628f1b615 eea2883a2 . . . .

Based on the image history file of the dotnet/runtime: 3.1-alpine3.12 container, source file comparison unit 76 determines that the commands in lines 20-24 of the container image history file 74 of the Docker image match the commands in lines 2-6 of the dotnet history file.

As described above, depending on the other containers being built to fully validate the primary container, build integrity validation system 48C may need to inspect and validate the container source files and container images of the other containers used to construct the primary container image being validated. Returning to the above example of the container OWASP dependency-check version 6.2.2, the Dockerfile extracts files from other containers. For example, the top three lines of the Dockerfile include references to additional containers such that build server 44C may reference the other containers and copy files from them into the container being built, which is referred to as a multistage build.

Line 1 of the Dockerfile references the golang: 1.16-alpine container:
   FROM golang: 1.16-alpine AS go
Then on line 20, the Dockerfile includes a command to copy the contents of the/usr/local/go//directory into the container image being built:
   COPY—from=go /usr/local/go/ /usr/local/go/
According to the disclosed techniques, build integrity validation system 48C may extract these files from the golang: 1.16-alpine container image and compare them to the container image history file 74 from the Docker image. In addition, build integrity validation system 48C may extract the layers of the images into a tar file that can be expanded and compared, as follows:
   docker save owasp/dependency-check: 6.2.2>dependency-check.tar
   docker save golang: 1.16-alpine >golang.tar
Build integrity validation system 48C may then find the/usr/local/go in the tar files and validate that the data was copied from the golang: 1.16-alpine container image to the Docker image correctly.

In order to determine that the container image is producible by the container source file, source file comparison unit 76 determines that the source code assertions in container image history file 74 created from the container image produced during the software build process at build server 44C match the one or more commands in the actual data of the container source file, including any references to other container images, which indicates that no additional code or data was introduced during the software build process of the container source file at build server 44C. Based on the validation that the container image in container image repository 46C is producible by the actual data of the container source file from container source file repository 42C, build integrity validation system 48C may enable deployment or delivery of software container 50C to a customer or client.

In order to determine that the container image is not producible by the container source file, source file comparison unit 76 identifies that at least one discrepancy occurs between the source code assertions in container image history file 74 and the actual data of the container source file by identifying at least one source code assertion in container image history file 74 created from the container image that does not match the one or more commands in the actual data of the container source file, including any references to other container images. Source file comparison unit 76 stores the identified discrepancy in discrepancy file 78. Build integrity validation system 48C may generate a report indicating the identified discrepancy between the container image and the container source file. In some examples, build integrity validation system 48C may generate a notification indicating that additional code or data was potentially introduced during the software build process of the container source file at build server 44C. Build integrity validation system 48C may send the report and/or the notification to admin device 47C.

In some situations, not all steps in a container source file may be easily validated as they may refer to or rely on ephemeral resources. Specifically, it is common for containers to pull in arbitrary resources from the internet using "curl," "wget," or other commands to download files from any URL. While build integrity validation system 48C may be able to download the resource and compare it to what is found in the container image being validated, if a difference is found it may not indicate that the container image is compromised. Rather, the different may merely indicate that the externally referenced resource was updated. For this reason, validation of content retrieved from external URLs may require additional manual inspection and validation.

Figure 3:
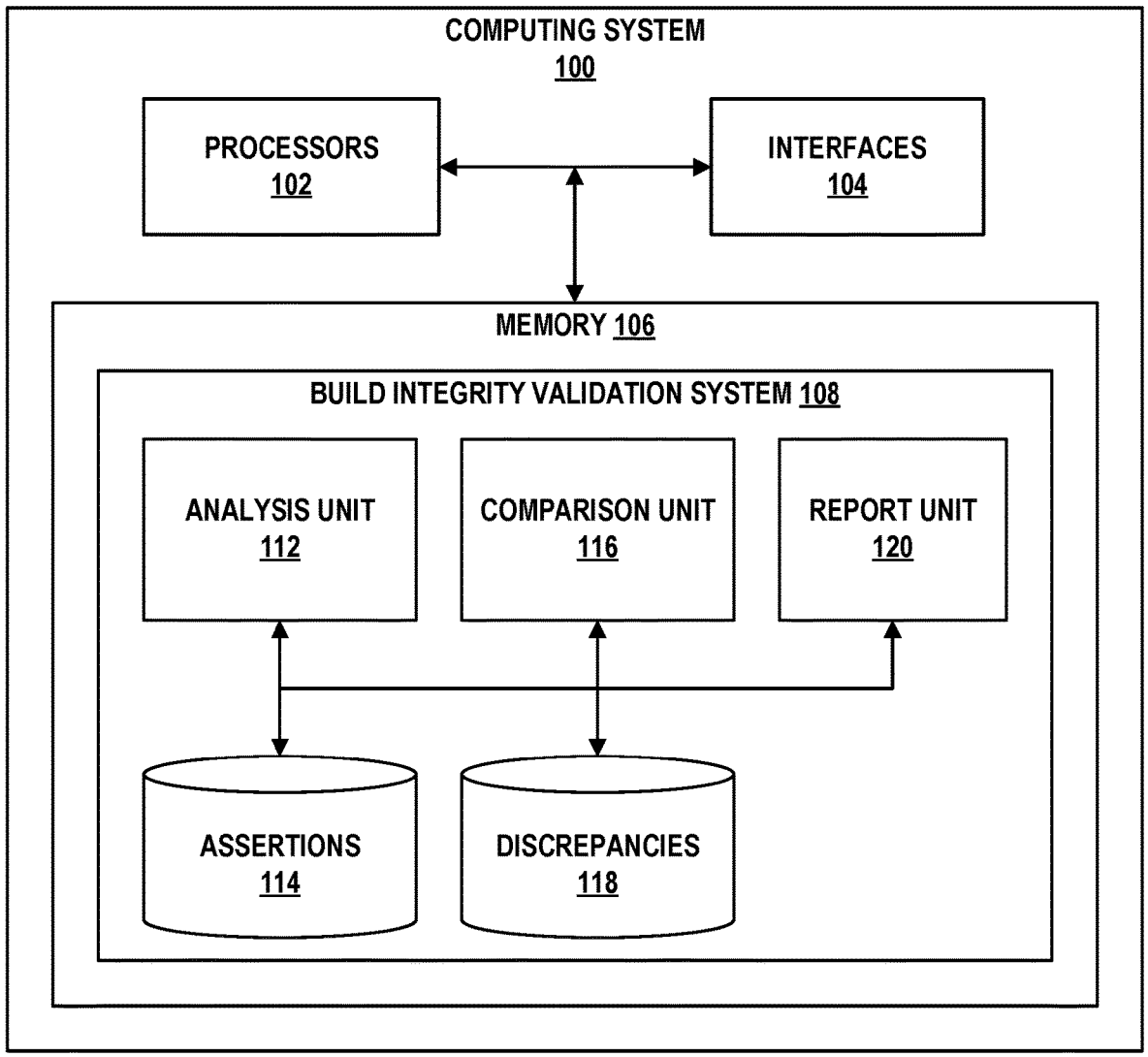
FIG. 3 is a block diagram illustrating an example computing system configured to execute a build integrity validation system, in accordance with the techniques of this disclosure.

FIG. 3 is a block diagram illustrating an example computing system 100 configured to support a build integrity validation system 108, in accordance with the techniques of this disclosure. In some examples, build integrity validation system 108 may operate substantially similar to build integrity validation system 28 of FIG. 1, build integrity validation system 48A of FIG. 2A, build integrity validation system 48B of FIG. 2B, and/or build integrity validation system 48C of FIG. 2C.

In the example of FIG. 3, computing system 100 includes processors 102, interfaces 104, and memory 106. Memory 106 stores build integrity validation system 108 that includes an analysis unit 112, a comparison unit 116, a report unit 120, an assertions database 114, and a discrepancies database 118. As illustrated in FIG. 3, the components, units or modules of computing system 100 are coupled (physically, communicatively, and/or operatively) using communication channels for inter-component communications. In some examples, the communication channels may include a system bus, a network connection, an inter-process communication data structure, or any other method for communicating data.

Processors 102, in one example, may comprise one or more processors that are configured to implement functionality and/or process instructions for execution within computing system 100. For example, processors 102 may be capable of processing instructions stored by memory 106. Processors 102 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Memory 106 of computing system 100 may store an operating system (not shown) executable by processors 62 to control the operation of components of computing system 100. Memory 106 may also be configured to store information within computing system 100 during operation. Memory 106 may include a computer-readable storage medium or computer-readable storage device. In some examples, memory 106 includes one or more of a short-term memory or a long-term memory. Memory 106 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, memory 106 is used to store program instructions for execution by processors 102. Memory 106 may be used by software or applications running on computing device 102 (e.g., build integrity validation system 108) to temporarily store information during program execution.

Computing system 100 may utilize interfaces 104 and/or application programming interfaces (APIs) to communicate with other systems or devices via one or more connections or networks, e.g., source code repository 22, build artifact repository 26, and/or admin device 32 of FIG. 1. Interfaces 104 may be network interfaces (such as Ethernet interfaces, optical transceivers, radio frequency (RF) transceivers, Wi-Fi or Bluetooth radios, or the like), telephony interfaces, or any other type of devices that can send and receive information.

Assertions database 114 and discrepancies database 118 represent one or more respective computer-readable storage media, which may be included within computing system 100 as shown in the example of FIG. 3. Alternatively, one or more of assertions database 114 and discrepancies database 118 may be stored to one or more remote devices accessible by computing system 100 via interfaces 104 and/or APIs. The computer-readable storage media may be one or more of a hard disk, a flash drive, random access memory (RAM), or other such computer-readable storage media.

Build integrity validation system 108 may operate substantially similar to build integrity validation system 28 of FIG. 1, build integrity validation system 48A of FIG. 2A, build integrity validation system 48B of FIG. 2B, and/or build integrity validation system 28C of FIG. 2C. Analysis unit 112 may extract information from source code and/or build artifacts and then create assertions based on the extracted information. For example, analysis unit 112 may operate substantially similar to one or more of build artifact analysis unit 52 of FIG. 2A, source code analysis unit 62 of FIG. 2B, or container image analysis unit 72 of FIG. 2C. The assertions may be stored in assertions database 114. Assertions database 114 may store a data file of source code assertions, e.g., source code assertions 54 of FIG. 2A, a data file of build artifact assertions, e.g., build artifact assertions 64 of FIG. 2B, and/or a container image history file including source code assertions, e.g., container image history file 74 of FIG. 2C.

Comparison unit 116 may compare the assertions stored in assertions database 114 against either the build artifacts in the case of source code assertions or the source code in the case of build artifact assertions. For example, comparison unit 116 may operate substantially similar to one or more of source code comparison unit 56 of FIG. 2A, build artifact comparison unit 66 of FIG. 2B, or source file comparison unit 76. Comparison unit 116 may further identify, based on the comparison, one or more discrepancies between the source code and the plurality of build artifacts that were produced during the build process. Discrepancies database 118 may store discrepancies with respect to failed source code assertions 54 stored in discrepancy file 58 of FIG. 2A, discrepancies with respect to failed build artifact assertions 64 stored in discrepancy file 68 of FIG. 2B, and/or discrepancies with respect to failed source code assertions in container image history file 74 stored in discrepancy file 78 of FIG. 2C.

Report unit 120 is configured to generate one or more reports indicating the discrepancies between the source code and the plurality of build artifacts. In some examples, the reports generated by report unit 120 may include information about the source code and information about the build artifact for each discrepancy. In further examples, the reports generated by report unit 120 may include notifications indicating that additional data was potentially introduced during the software build process of the source code and/or that a portion of the actual data of the source code was potentially removed or modified during the software build process of the source code. Report unit 120 may output the reports via interfaces 104 of computing system 100 to an admin device, e.g., admin device 32 of FIG. 1, admin device 47A of FIGS. 2A and 2B, admin device 47C of FIG. 2C, or another computing device.

Figure 4:
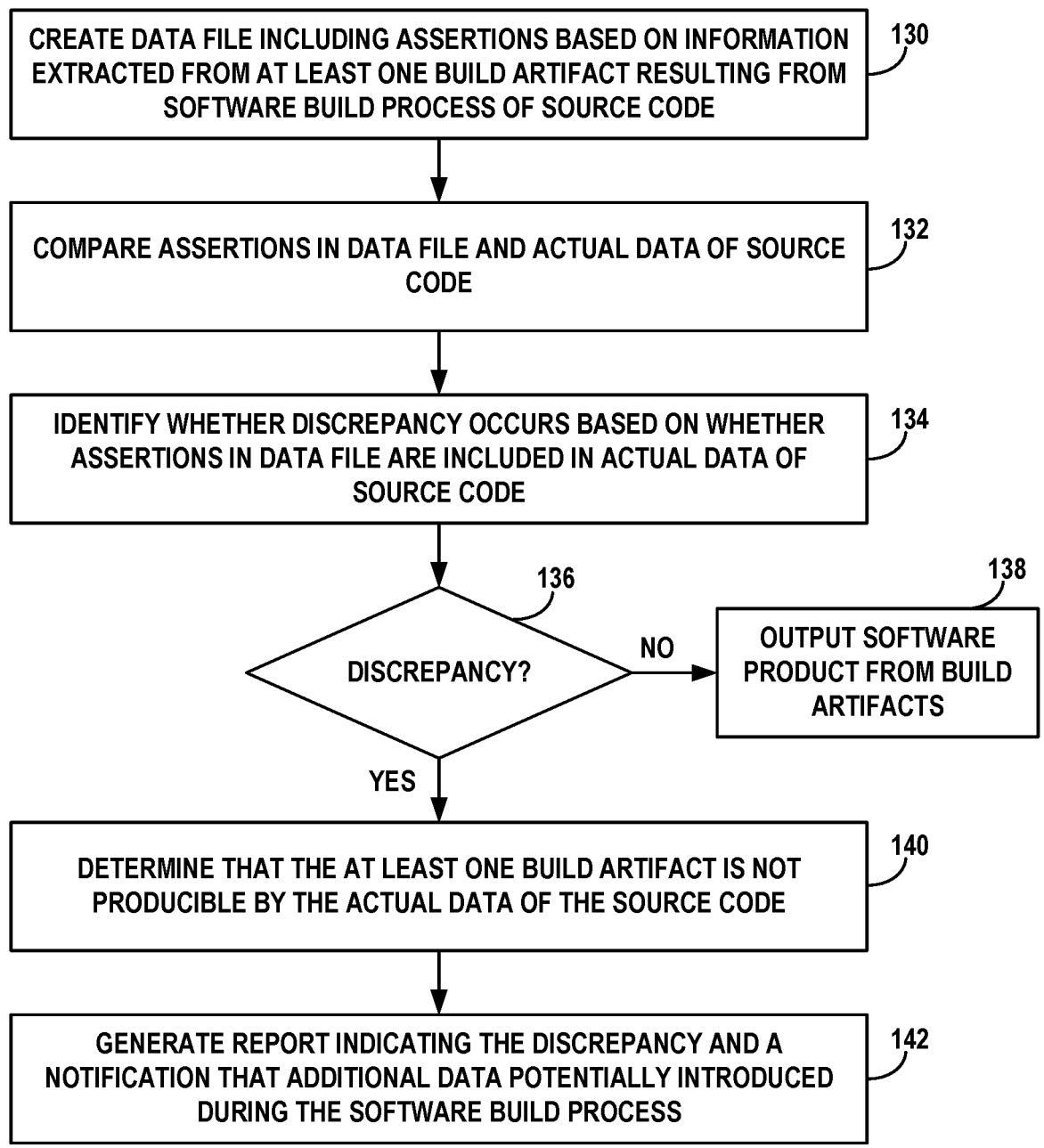
FIG. 4 is a flowchart illustrating an example operation of validating build integrity by comparing build artifacts against source code to ensure that no malicious code tampering occurred during the build process, in accordance with the techniques of this disclosure.

FIG. 4 is a flowchart illustrating an example operation of validating build integrity by comparing build artifacts against source code to ensure that no malicious code tampering occurred during the build process, in accordance with the techniques of this disclosure. For purposes of explanation, the example operation of FIG. 4 is described with respect to build integrity validation system 28 of FIG. 1. In other examples, the operation of FIG. 4 could be performed by any of build integrity validation system 48A of FIG. 2A, build integrity validation system 48B of FIG. 2B, build integrity validation system 48C of FIG. 2C, or build integrity validation system 108 running on computing system 100 of FIG. 3.

Build integrity validation system 28 creates a data file including one or more assertions based on information extracted from at least one build artifact of a plurality of build artifacts resulting from a software build process of source code at build server 24 (130). In one example, build integrity validation system 28 receives a build artifact from build artifact repository 26, extracts one or more software components from the build artifact, and creates one or more source code assertions that the source code is expected to include definitions of the one or more software components extracted from the build artifact. In another example, build integrity validation system 28 receives a container image from build artifact repository 26, extracts a history of one or more commands executed to build the container image during the software build process of the container source file, and creates a container image history file including one or more source code assertions that the container source file is expected to include the one or more commands extracted from the container image.

Build integrity validation system 28 compares the assertions in the data file and the actual data of the source code (132). In one example, build integrity validation system 28 compares each source code assertion of the one or more source code assertions against one or more definitions of software components in the actual data of the source code received from source code repository 22. In another example, build integrity validation system 28 compares each source code assertion of the one or more source code assertions in the container image history file against one or more commands in the actual data of the container source file received from source code repository 22. In this example, build integrity validation system 28 compares each source code assertion of the one or more source code assertions read entry-by-entry from top-down in the container image history file against each command of the one or more commands read entry-by-entry from bottom-up in the container source file.

Based on the comparison, build integrity validation system 28 identifies whether at least one discrepancy occurs between the assertions in the data file and the actual data of the source code by identifying whether at least one assertion created from the at least one build artifact is not included in the actual data of the source code (134). When no discrepancy is identified (NO branch of 136), the absence of a discrepancy between the assertions and the source code indicates that no additional code was introduced during the software build. In this scenario (NO branch of 136), build integrity validation system 28 may output software product 30 from the build artifacts for deployment or delivery to a customer or client (138).

In some scenarios, in response to identifying no discrepancy between the one or more source code assertions and the actual data of the source code, build integrity validation system 28 may perform a "reverse comparison" to determine whether any security features or other code was removed from the source code during the software build process. In these scenarios, build integrity validation system 28 receives the source code from source code repository 22, extracts one or more definitions of software components from the source code, and creates one or more build artifact assertions that the plurality of build artifacts is expected to include one or more software components of the one or more definitions extracted from the source code. Build integrity validation system 28 compares the build artifact assertions against the plurality of build artifacts received from build artifact repository 26. Build integrity validation system 28 then identifies whether at least one discrepancy occurs between the one or more build artifact assertions and the plurality of build artifacts. In examples where build integrity validation system 28 identifies that at least one build artifact assertion created from the source code is not included in the plurality of build artifacts resulting from the software build process of the source code, build integrity validation system determines that the actual data of the source code is unable to produce the plurality of build artifacts, which indicates that a portion of the source code was potentially removed or modified during the software build. In some examples, build integrity validation system 28 generates a report indicating the at least one discrepancy between the source code and the plurality of build artifacts and, in some cases, a notification indicating that a portion of the actual data of the source code was potentially removed or modified during the software build process of the source code that produced the plurality of build artifacts.

When at least one discrepancy is identified (YES branch of 136), build integrity validation system 28 determines that the at least one build artifact is not producible by the actual data of the source code (140). In one example, build integrity validation system 28 identifies at least one source code assertion created from the at least one build artifact that does not match the one or more definitions of software components in the actual data of the source code such that the at least one build artifact is not producible by the actual data of the source code, which indicates that additional code was potentially introduced during the software build. In another example, build integrity validation system 28 identifies at least one source code assertion in the container image history file created from the container image that does not match the one or more commands in the actual data of the container source file such that the container image is not producible by the actual data of the container source file, which indicates that additional code was potentially introduced during the software build.

In some scenarios, when a source code assertion of the one or more source code assertions at a given entry in the container image history file does not match a command at a corresponding entry in the actual data of the container source file, build integrity validation system 28 may determine that the corresponding step in the actual data of the container source file comprises a reference to a second container image, access the second container image, create a second container image history file including one or more commands executed to build the second container image, and compare the source code assertion at the given entry in the container image history file against the one or more commands in the second container image history file of the second container image. In these scenarios, build integrity validation system 28 may identify that the source code assertion at the given entry in the container image history file created from the container image does not match the one or more commands in the second container image history file created from the second container image such that the container image is not producible by the actual data of the container source file including the reference to the second container image, which indicates that additional code was potentially introduced during the software build.

Build integrity validation system 28 generates a report indicating the at least one discrepancy between the at least one build artifact and the source code and, in some cases, a notification indicating that additional data was potentially introduced during the software build process of the source code that produced the at least one build artifact (142). Build integrity validation system 28 may output the report to admin device 32.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

What is claimed is:

1. A method comprising:

creating, by a computing system, a data file based on information extracted from at least one build artifact resulting from a software build process of source code, wherein the data file includes one or more assertions with respect to one or more definitions of software components expected to be included in the source code in order to produce the at least one build artifact;

comparing, by the computing system, the one or more assertions in the data file and definitions of software components in the actual data of the source code;

identifying, by the computing system and based on the comparison, whether at least one discrepancy occurs between the one or more assertions in the data file and the actual data of the source code, wherein identifying that the at least one discrepancy occurs comprises identifying at least one assertion created from the at least one build artifact that is not included in the actual data of the source code such that the at least one build artifact is not producible by the actual data of the source code; and in response to identifying the at least one discrepancy, generating, by the computing system, a report indicating the at least one discrepancy between the at least one build artifact and the source code.

2. The method of claim 1, wherein generating the report comprises generating a notification indicating that additional data was potentially introduced during the software build process of the source code that produced the at least one build artifact.

3. The method of claim 1, wherein the source code is compiled into the at least one build artifact by a build server, and wherein the build server is independent from the computing system.

4. The method of claim 1, wherein the source code comprises source code of a software application and the at least one build artifact comprises at least one build artifact of a plurality of build artifacts resulting from the software build process of the source code, wherein creating the data file comprises:

extracting one or more software components from the at least one build artifact, and creating one or more source code assertions that the source code is expected to include the one or more definitions of the one or more software components extracted from the at least one build artifact; and wherein comparing the one or more assertions in the data file and the definitions of the software components in the actual data of the source code comprises comparing each source code assertion of the one or more source code assertions against one or more definitions of the definitions of the software components in the actual data of the source code.

5. The method of claim 4, wherein identifying that the at least one discrepancy occurs comprises identifying at least one source code assertion created from the at least one build artifact that does not match the one or more definitions of software components in the actual data of the source code such that the at least one build artifact is not producible by the actual data of the source code.

6. The method of claim 4, wherein identifying whether the at least one discrepancy occurs comprises identifying whether at least one first discrepancy occurs based on a first comparison between the one or more source code assertions and the definitions of the software components in the actual data of the source code, and wherein in response to identifying no first discrepancy between the one or more source code assertions and the definitions of the software components in the actual data of the source code, the method further comprises:

creating one or more build artifact assertions based on the definitions of the software components in the actual data extracted from the source code;

comparing the one or more build artifact assertions and the plurality of build artifacts resulting from the software build process of the source code as a second comparison; and identifying, based on the second comparison, whether at least one second discrepancy occurs between the one or more build artifact assertions and the plurality of build artifacts, wherein identifying that the at least one second discrepancy occurs comprises identifying at least one build artifact assertion created from the source code that is not included in the plurality of build artifacts resulting from the software build process of the source code such that the actual data of the source code is unable to produce the plurality of build artifacts.

7. The method of claim 6, wherein creating the one or more build artifact assertions comprises:

extracting one or more definitions of the definitions of the software components from the source code; and creating the one or more build artifact assertions that the plurality of build artifacts is expected to include one or more software components of the one or more definitions extracted from the source code.

8. The method of claim 6, wherein generating the report comprises generating a notification indicating that a portion of the actual data of the source code was potentially removed or modified during the software build process of the source code that produced the plurality of build artifacts.

9. The method of claim 1, wherein the source code comprises a container source file of a software container and the at least one build artifact comprises a container image resulting from the software build process of the container source file, wherein creating the data file comprises:

extracting a history of one or more commands executed to build the container image during the software build process of the container source file, and creating a container image history file including one or more source code assertions that the container source file is expected to include the one or more commands extracted from the container image; and wherein comparing the one or more assertions in the data file and the definitions of the software components in the actual data of the source code comprises comparing each source code assertion of the one or more source code assertions in the container image history file against one or more commands in the actual data of the container source file.

10. The method of claim 9, wherein identifying that the at least one discrepancy occurs comprises identifying at least one source code assertion in the container image history file created from the container image that does not match the one or more commands in the actual data of the container source file such that the container image is not producible by the actual data of the container source file.

11. The method of claim 9, wherein comparing each source code assertion in the container image history file against the one or more commands in the actual data of the container source file comprises comparing each source code assertion of the one or more source code assertions read entry-by-entry from top-down in the container image history file against each command of the one or more commands read entry-by-entry from bottom-up in the container source file.

12. The method of claim 11, further comprising, when a source code assertion of the one or more source code assertions at a given entry in the container image history file does not match a command at a corresponding entry in the actual data of the container source file:
   determining that the corresponding step in the actual data of the container source file comprises a reference to a second container image;
   accessing the second container image;
   creating a second container image history file including one or more commands executed to build the second container image; and
   comparing the source code assertion at the given entry in the container image history file against the one or more commands in the second container image history file of the second container image.

13. The method of claim 12, wherein identifying that the at least one discrepancy occurs comprises identifying that the source code assertion at the given entry in the container image history file created from the container image does not match the one or more commands in the second container image history file created from the second container image such that the container image is not producible by the actual data of the container source file including the reference to the second container image.

14. A computing system comprising:
   a memory; and
   one or more processors in communication with the memory, the one or more processors configured to:
      create a data file based on information extracted from at least one build artifact resulting from a software build process of source code, wherein the data file includes one or more assertions with respect to one or more definitions of software components expected to be included in the source code in order to produce the at least one build artifact;
      compare the one or more assertions in the data file and definitions of software components in the actual data of the source code;
      identifying, based on the comparison, whether at least one discrepancy occurs between the one or more assertions in the data file and the actual data of the source code, wherein identifying that the at least one discrepancy occurs comprises identifying at least one assertion created from the at least one build artifact that is not included in the actual data of the source code such that the at least one build artifact is not producible by the actual data of the source code; and
      in response to identifying the at least one discrepancy, generate a report indicating the at least one discrepancy between the at least one build artifact and the source code.

15. The computing system of claim 14, wherein to generate the report, the one or more processors are configured to generate a notification indicating that additional data was potentially introduced during the software build process of the source code that produced the at least one build artifact.

16. The computing system of claim 14, wherein the source code comprises source code of a software application and the at least one build artifact comprises at least one build artifact of a plurality of build artifacts resulting from the software build process of the source code,
   wherein to create the data file, the one or more processors are configured to:
      extract one or more software components from the at least one build artifact, and
      create one or more source code assertions that the source code is expected to include the one or more definitions of the one or more software components extracted from the at least one build artifact; and
   wherein to compare the one or more assertions in the data file and the definitions of the software components in the actual data of the source code, the one or more processors are configured to compare each source code assertion of the one or more source code assertions against one or more definitions of the definitions of the software components in the actual data of the source code.

17. The computing system of claim 16, wherein to identify whether the at least one discrepancy occurs the one or more processors are configured to identify whether at least one first discrepancy occurs based on a first comparison between the one or more source code assertions and the definitions of the software components in the actual data of the source code, and wherein in response to identifying no first discrepancy between the one or more source code assertions and the definitions of the software components in the actual data of the source code, the one or more processors are further configured to:
   create one or more build artifact assertions based on the definitions of the software components in the actual data extracted from the source code;
   compare the one or more build artifact assertions and the plurality of build artifacts resulting from the software build process of the source code as a second comparison; and
   identify, based on the second comparison, whether the at least one second discrepancy occurs between the one or more build artifact assertions and the plurality of build artifacts, wherein to identify that the at least one second discrepancy occurs, the one or more processors are configured to identify at least one build artifact assertion created from the source code that is not included in the plurality of build artifacts resulting from the software build process of the source code such that the actual data of the source code is unable to produce the plurality of build artifacts.

18. The computing system of claim 14, wherein the source code comprises a container source file of a software container and the at least one build artifact comprises a container image resulting from the software build process of the container source file, wherein to create the data file, the one or more processors are configured to:
- extract a history of one or more commands executed to build the container image during the software build process of the container source file, and
- create a container image history file including one or more source code assertions that the container source file is expected to include the one or more commands extracted from the container image; and wherein to compare the one or more assertions in the data file and the definitions of the software components in the actual data of the source code, the one or more processors are configured to compare each source code assertion of the one or more source code assertions in the container image history file against one or more commands in the actual data of the container source file.

19. The computing system of claim 18, wherein the one or more processors are configured to, when a source code assertion of the one or more source code assertions at a given entry in the container image history file does not match a command at a corresponding entry in the actual data of the container source file:
- determine that the corresponding step in the actual data of the container source file comprises a reference to a second container image;
- access the second container image;
- create a second container image history file including one or more commands executed to build the second container image; and
- compare the source code assertion at the given entry in the container image history file against the one or more commands in the second container image history file of the second container image.

20. A computer-readable storage medium comprising instructions that, when executed, cause one or more processors to:
- create a data file based on information extracted from at least one build artifact resulting from a software build process of source code, wherein the data file includes one or more assertions with respect to one or more definitions of software components expected to be included in the source code in order to produce the at least one build artifact;
- compare the one or more assertions in the data file and definitions of software components in the actual data of the source code;
- identify, based on the comparison, whether at least one discrepancy occurs between the one or more assertions in the data file and the actual data of the source code, wherein identifying that the at least one discrepancy occurs comprises identifying at least one assertion created from the at least one build artifact that is not included in the actual data of the source code such that the at least one build artifact is not producible by the actual data of the source code; and
- in response to identifying the at least one discrepancy, generate a report indicating the at least one discrepancy between the at least one build artifact and the source code.

\* \* \* \* \*